F. C. HARDING.
BEET HARVESTER.
APPLICATION FILED OCT. 9, 1908.

937,994.

Patented Oct. 26, 1909.
5 SHEETS—SHEET 1.

Witnesses
E. W. Stewart
F. T. Chapman

Inventor
Frederic C. Harding.
By C. A. Snow & Co.
Attorneys

F. C. HARDING.
BEET HARVESTER.
APPLICATION FILED OCT. 9, 1908.

937,994.

Patented Oct. 26, 1909.
5 SHEETS—SHEET 3.

Witnesses
Inventor
Frederic C. Harding
By C. A. Snow & Co.
Attorneys

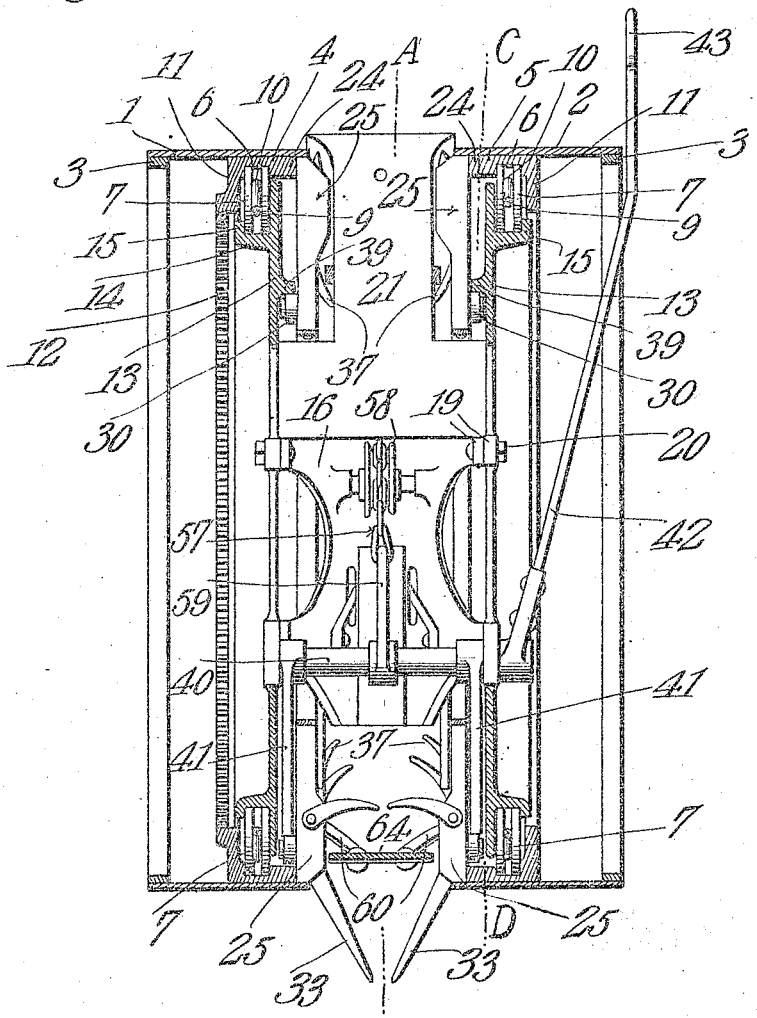

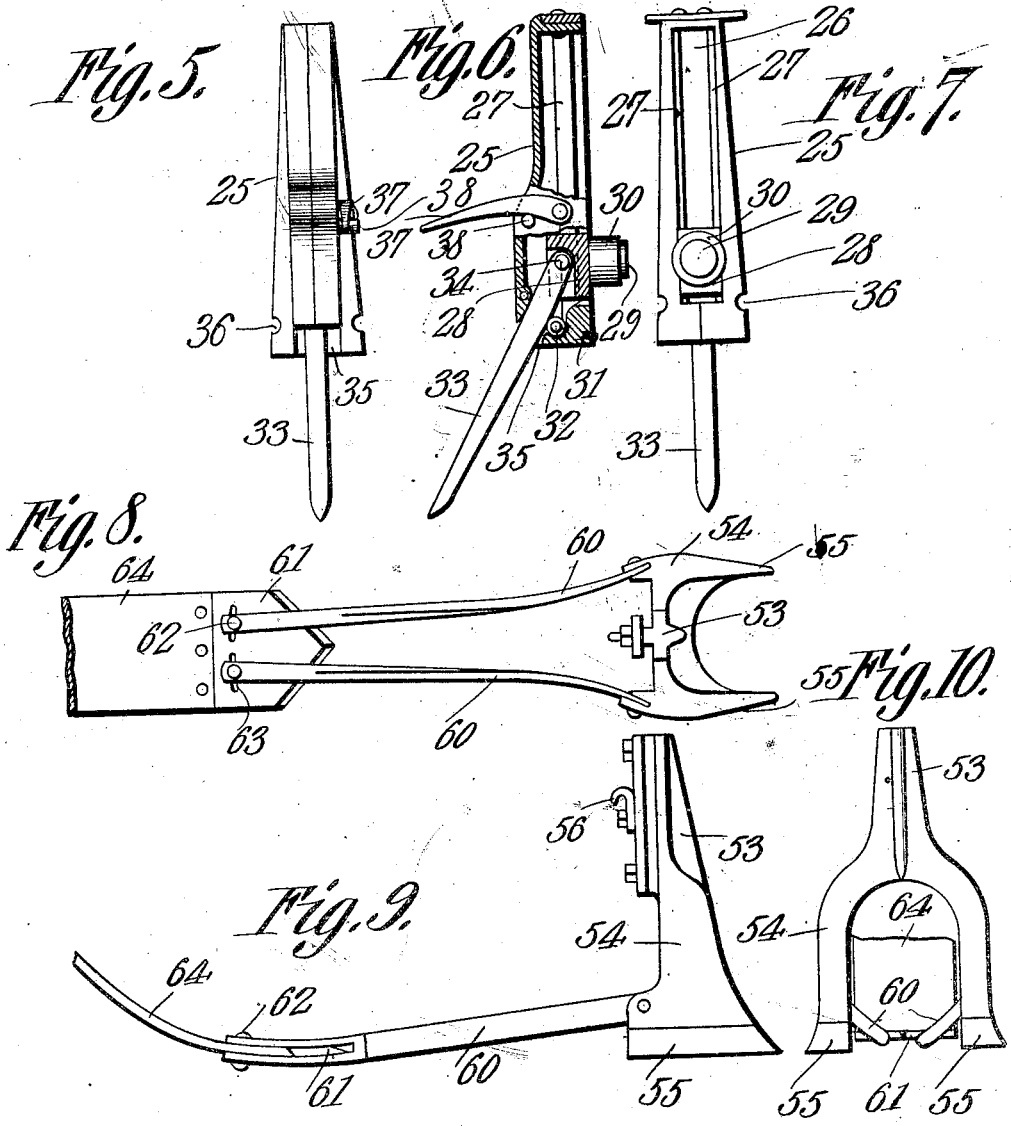

UNITED STATES PATENT OFFICE.

FREDERIC C. HARDING, OF DENVER, COLORADO, ASSIGNOR OF TWO-THIRDS TO NELSON G. LAWSON, OF DENVER, COLORADO.

BEET-HARVESTER.

937,994.                    Specification of Letters Patent.    Patented Oct. 26, 1909.

Application filed October 9, 1908. Serial No. 456,984.

To all whom it may concern:

Be it known that I, FREDERIC C. HARDING, a citizen of the United States, residing at Denver, in the county of Denver and State of Colorado, have invented a new and useful Beet-Harvester, of which the following is a specification.

This invention has reference to improvements in beet harvesters and is designed to provide a machine which will remove the top of the beet and then lift the beet root from the ground and direct the top or calyx and the root to different points of deposit.

In accordance with the present invention there are provided two supporting rollers spaced apart for a suitable distance by a frame work designed to carry certain portions of the structure and to which draft animals may be attached for the dragging of the machine across the field where the beets are to be extracted.

The machine is provided with a plow of special construction designed to loosen up the dirt on each side of the beet and in conjunction with this plow there is provided a knife or cutter which will remove the calyx from the beet root, and as soon as this is accomplished the beet root is engaged by fingers which have been inserted into the ground at a suitable angle to under-ride the beet and the latter is lifted out of the ground and on to a suitable conveyer to be deposited in any suitable receptacle. In the meantime the calyx or beet top is conveyed to another point of deposit from which it may be directed to a suitable receptacle or to the ground as desired.

The structure forming the subject matter of the present invention will be best understood from a consideration of the following detail description taken in connection with the accompanying drawings, with the understanding however that the invention is not confined to any exact details of structure or shape of parts or arrangement of the mechanism, since the structure may be variously modified without in any manner departing from the invention.

Figure 1:
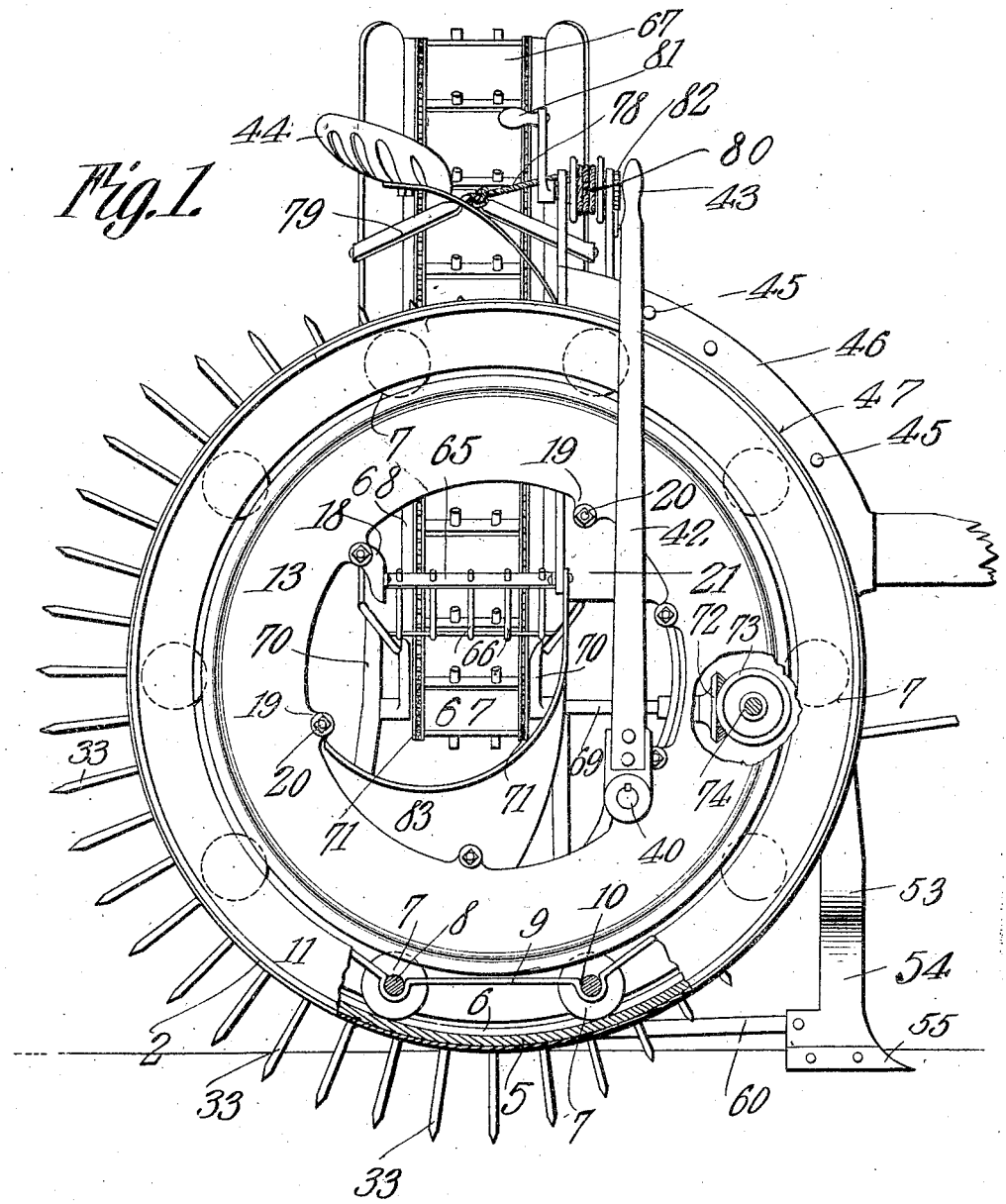
Figure 2:
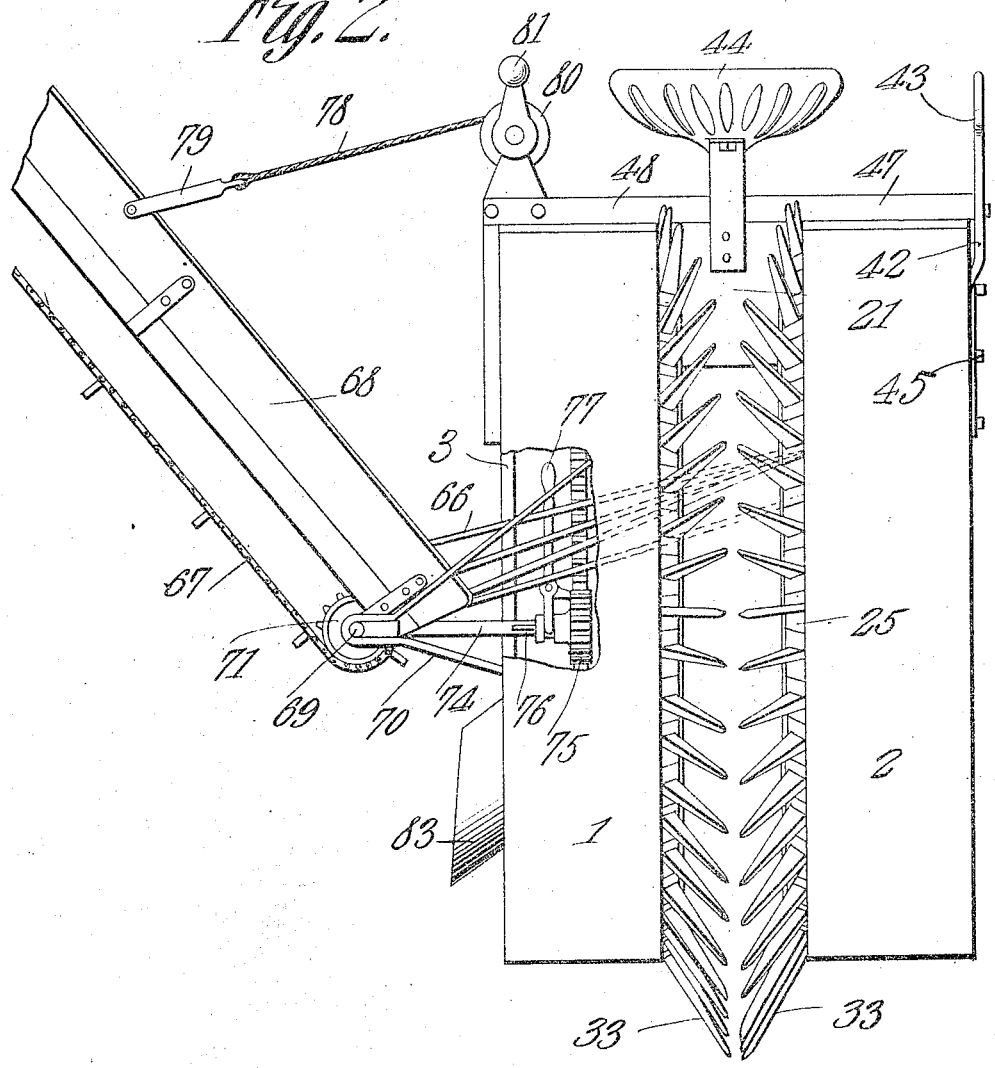
Figure 3:
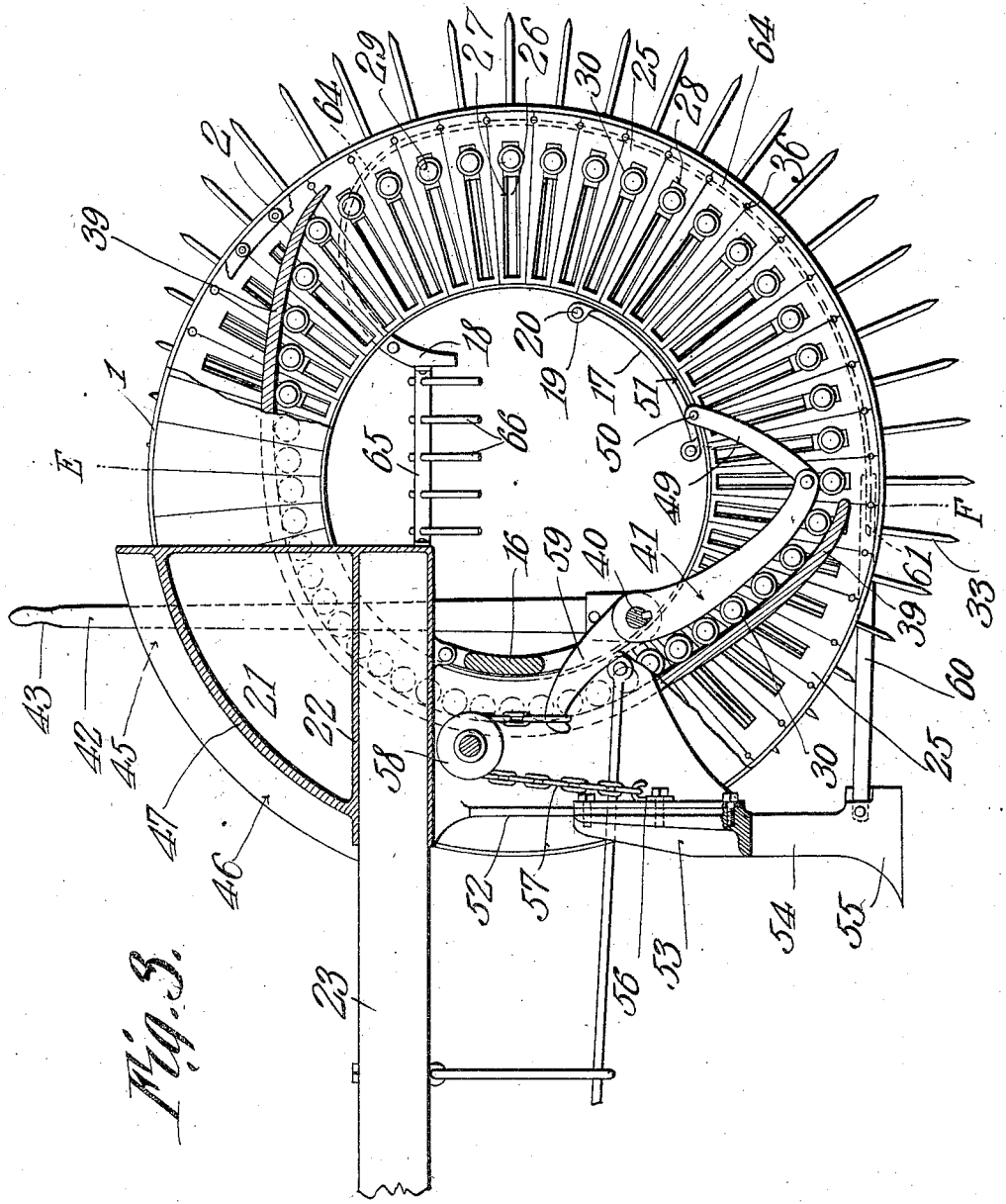

In the drawings Figure 1 is a side elevation of the structure with parts in section. Fig. 2 is a rear elevation of the machine with parts broken away. Fig. 3 is a longitudinal section of the machine taken partly on the line A—B and partly on the line C—D of Fig. 4. Fig. 4 is a vertical cross section on the line E—F of Fig. 3 with parts omitted. Figs. 5 to 10 both inclusive are views of details of the construction.

Referring to the drawings there are shown two drums or rollers 1—2 each being formed near its outer edge with an internal strengthening ring or rib 3 which may be either formed on the rollers 1 and 2 or be secured thereto as desired.

Near the inner edge the roller 1 has on its inner periphery an annular track 4 and the roller 2 has a similar annular track 5, each track being formed about midway of its width with an annular groove 6 for the reception of a series of rollers 7 arranged upon axles 8 in spaced pairs. The several pairs of rollers in each drum are connected together in spaced relation by a rod 9 having at suitable and preferably equal intervals loops 10 partially embracing the axles 8. The rollers 7 are maintained by the rods 9 in equi-distant relation and are capable of rolling along the grooves 6 of the tracks 4 or 5 as the case may be. The outer edge of each track 4 and 5 is provided with an inwardly directed flange 11, and the flange 11 of the track 4 is formed with internally directed gear teeth 12 the purpose of which will hereinafter appear.

Housed in each drum about coincident with the inner edge of the tracks 4 or 5 as the case may be is a disk-like annulus 13 formed on the outer face with an annular ledge 14 around which is formed a radial flange 15 at the end of the ledge remote from the annulus 13. The ledge 14 of each annulus 13 is in matched relation to the groove 6 of the corresponding track 4 or 5 and the ledge forms the inner runway for the rollers 7, these rollers serving to support each annulus 13 in the respective drum 1 or 2. The annuli 13 are connected together by cross pieces or yokes 16, 17 and 18, there being three such yokes equi-distantly spaced in the structure shown in the drawings. The yokes are connected to each annulus by means of matched lugs 19 and bolts 20 in a manner usual in metal structures. Fast to the yoke 16 and also to the annuli 13 is a skeleton frame 21 shaped to support certain portions of the structure and also formed with a pocket or receptacle 22 for a draft pole 23 to which the draft animals may be attached.

Each track 4 and 5 is provided on the inner edge with an annular enlargement 24 for the attachment to the track of segmental frames 25 best shown in Figs. 5, 6 and 7. These frames are so shaped that they may project radially inward from the enlargement 24 and form a continuous annular series on each drum 1 and 2 inside the annulus 13. Each frame 25 is formed with a longitudinal central slot 26 on each side of which the frame is formed with a longitudinal guide 27, there being two opposed guides 27 in parallel relation to each frame. Sliding in these guides is a block 28 from which there projects a stud or pintle 29 carrying a roller 30, the said roller being beyond the corresponding edge of the frame 25. The larger end of the frame 25 is formed with an interior shoulder 31 carrying an anti-friction directing roller 32 for an elongated finger 33, pivotally connected to the block 28 as indicated at 34 and extending normally through a slot 35 in the corresponding end of the frame 25 on the side thereof opposite from the roller 30. On each side of the frame 25 near the larger end thereof is a semi-circular recess 36, the several recesses matching one another for the passage of suitable bolts or machine screws by means of which the segmental frames are attached to the enlargement 24 of the tracks 4 and 5. On one side of each frame 25 there is pivoted a tooth 37 projecting in a direction opposite from the roller 30, and the movement of this tooth 37 in one direction is limited by a stop pin 38 projecting from the frame 25. When all the frames 25 are in place they are so located that the fingers 33 and teeth 37 of one set of frames project toward the fingers 33 and teeth 37 of the other set of frames. Under these conditions the rollers 30 project toward the annulus 13 on the corresponding roller 1 or 2.

On each annulus 13 on the face toward the frames 25 there is formed a ledge 39 arranged in the path of the respective set of rollers 30 and beginning at a point near the bottom of the machine and slightly in front of the vertical plane coincident with the length of the axis of the rollers 1 and 2. Each ledge 39 continues toward the front of the machine in an upward direction and approaches the axis of the drums 1 and 2 until close to the inner ends of the frames 25 and is then continued concentric with the axis of the drums to a point approximately above the point of beginning and is then directed toward the rear of the machine approximately tangent to the concentric portion and finally terminates in a downwardly directed end close to the outer ends of the frames 25 at this point. The ledges 39 serve to control the fingers 33 by acting upon the rollers 30 and cause a longitudinal movement of the blocks 28 through the length of the frames 25, thereby causing a like movement of the fingers 33.

Assuming the position of the parts shown in Fig. 3 and considering a roller 30 just engaging the ledge 39 at the upper rear end thereof it will be seen that this roller when the corresponding drum is rotated is engaged by the ledge 39 and the block 28 is caused to traverse the length of the frame 25 retracting the finger 33 which before had been projected beyond the periphery of the corresponding drum 1 or 2 through the slot 35 in the frame 25. This retraction of the finger 33 continues as the rotation of the drum continues and the retraction progresses until the concentric portion of the ledge is reached, this being so located that the finger 33 under consideration is fully retracted inside the periphery of the drum 1 or 2.

As the machine progresses over the ground the particular finger under consideration will ultimately be brought around toward the front of the machine and be moved toward the ground. In the operation of the machine it is desirable that the finger be projected toward the ground from the periphery of the respective drum and at the same time be forced into the ground to the desired depth by the time it has reached a point directly beneath the axis of the drums. For this purpose there is provided a rock shaft 40 journaled in the yoke or frame 16 or in suitable journal bearings formed on the annuli 13 at appropriate points and this rock shaft 40 carries two arms 41, each arm being capable of being brought into operative relation to the rollers 30 in the frames 25 of the respective drum 1 or 2. Each arm 41 is keyed to the shaft 40 and is curved to agree with the curvature of the coincident portion of the ledge 39 so as to be in parallelism therewith when in operative relation to the rollers 30. The rock shaft 40 is under the control of a hand lever 42 having a handle 43 within easy reach of the operator who may be seated upon a suitable seat 44 on the top of the machine and carried by the frame 21. The hand lever 42 may be made slightly elastic in a lateral direction so that it may be locked in place by means of pins 45 disposed at suitable intervals in a flange 46 arranged outside of the respective roller and carried by a bracket 47 coming from the frame 21, this bracket in the present case being of a length subst ally that of the flange 46 and over-riding the corresponding face of the drum which in the particular structure shown in the drawings, is the drum 2. A similar bracket 48 may extend over the drum 1 to support certain parts of the structure and also to protect the person of the operator.

The fingers 33 are progressively forced into the ground by the engagement of the rollers 30 with the arm 41, this forcing into the ground being carried to the full extent before the rollers 30 escape from the free end of the arms 41. Since there is now no force tending to cause the retraction of the fingers 33 they will continue in the projected position until the rollers are again brought into engagement with the ledges 39 at the upper rear end of the machine. Sometimes however it is necessary to back the machine and then there is danger of the rollers already past the arms 41, engaging the free end of the arms and being directed thereby up above said arms and so becoming jammed. To avoid this each arm 41 is connected at its free end to a link 49 at one end of the latter and the other end of each link 49 is provided with a pin 50 engaging in a guideway 51 for a purpose which will presently appear. On backing the machine the rollers 30 will always be directed to the space between the arms 41 and the ledges 39 by the links 49.

Projecting downward from the frame 21 is a guiding bracket in which is mounted for vertical movement the stem 53 of a plow 54, this plow being in the form of an inverted U and terminating at the lower end of each leg of the U in a plow point 55. The plow points 55 are separated sufficiently to straddle beets so as to loosen the dirt on each side thereof without engaging said beets and the height of the plow frame above the ground is sufficient to over-ride the beet tops. The stem 53 of the plow is provided at the rear side with a hook 56 to which is attached a chain 57 passing up and over an idler roller 58 journaled in the yoke 16 and the other end of the chain engages the free end of a rock arm 59 fast on the shaft 40.

Whenever the lever 42 is operated to move the arms 41 into operative relation to the rollers 30 then the rock arm 59 is raised and the plow 54 is permitted to move down into proper relation to the ground. When it is desired to move the machine from place to place without operating the fingers 33 then the hand lever 42 is moved in a direction to rock the shaft so as to raise the arms 41 out of operative relation to the rollers 30, the pin 50 in the links 49 then riding along the ways 51 and the rock arm 59 is depressed and through the chain 57 passing over the pulley 58 causes the elevation of the plow 54 out of operative relation to the ground. Now when the machine is moved over the ground the fingers 33 not being forced outward will not enter the ground and will remain housed within the frames 25.

Attached to the rear sides of the arms of the plow 54 are two elastic strips 60—60 approaching each other normally toward their rear ends. These strips 60 are secured at their rear ends in a cutter blade 61, the means of securing being pins 62 extending through slots 63 in said cutter blade 61, the latter being provided with inclined edges meeting at a point at the front of the cutter blade as shown best in Fig. 8. The cutter blade 61 is secured to a band 64 extending between the series of frames 25 near the outer ends thereof and continued to a point near the rear end of the ledges 39 and then turned in toward the interior of the machine where it terminates at the yoke 18 to which it is secured. This band serves as a means for keeping the beet roots and tops separated and for guiding them toward the respective conveying means for disposing thereof.

Fast to the frames 18 and 21 and extending between the same is a bar 65 from which project rods 66 extending through the open central portion of the drum 1 to the exterior thereof where they lead to a conveyer apron 67 mounted in a suitable conveyer frame 68. The apron 67 and frame 68 may be the same as ordinary conveyer aprons and frames and therefore no detail description thereof is deemed necessary.

As will hereinafter appear the beet roots are carried outside of the guiding strip 64 and permitted to gravitate on to the rods 66 and these latter are inclined sufficiently to cause the beet roots to roll down to the conveyer 67 and by the latter the beet roots are elevated and ultimately deposited in a suitable receptacle such for instance as a wagon moving along with the harvester.

The conveyer frame 68 is mounted at the end adjacent to the drum 1 upon a pivot shaft 69 journaled in a bracket 70 fast to the respective annulus 13. The shaft 69 carries sprocket wheels 71 for driving the conveyer belt 67 in the usual manner. The shaft 69 in continued to one side of the conveyer and there carries a beveled pinion 72 meshing with a bevel gear 73 on one end of a counter shaft 74, and on the other end of this counter shaft is a pinion 75 capable of being brought into mesh with the gear teeth 12 before referred to. The pinion 75 is splined to the shaft 74 so as to rotate therewith but be capable of longitudinal movement thereon. The pinion 75 is under the control of a hand lever 77 by which the pinion may be moved into and out of mesh with the gear teeth 12 at the will of the operator, but since the conveyer apron 67 is to be in operation except when the machine is being transported from place to place this hand lever 77 may be located within the drum 1 so as to be accessible to the operator only when standing on the ground. Of course it is within the scope of the invention to carry the hand lever 77 through the center of the drum 1 to the outside of the said drum and then carry it up until it is within reach of the operator on the seat 44, but ordinarily such an arrangement is unnecessary.

The inclination of the conveyer may be adjusted by means of a rope or cable 78 connected to the conveyer by a yoke 79 and at the other end being made fast to a winding drum 80 mounted on the bracket or extension 48. The winding drum or windlass is provided with a manipulating handle 81 and may be provided with a pawl and ratchet construction 82 for holding the conveyer frame in adjusted positions. Any other means for holding the conveyer frame in the adjusted position may be employed.

Below the bar 65 and rods 66 there is a chute 83 leading to the exterior of the drum 1 through the open central portion thereof and this chute is designed to receive the beet tops and direct them to the exterior of the machine. In the present instance this chute is inclined so that beet tops readily gravitate to the exterior of the machine and drop to the ground.

Let it be assumed that the machine is in operation upon a field of beets. The plow points 5 5 enter the ground a short distance and they loosen up the ground on each side of the beet since the plow frame 54 straddles the beets as the machine is drawn over the field. The beet tops are engaged by the strip 60 and are directed thereby toward the knife or cutter 61. In the meantime the fingers 33 are being forced out of their casings 25 so as to enter the ground on each side of the beets and these fingers are not only directed outwardly by the forward movement of the block 28 but are directed one toward the other by the rollers 32 engaging the outer sides of the fingers to one side of the path of the pivoted end of each finger 33. By this means the fingers are made to enter the ground at the sides of the beet and then while entering the ground move toward the beet until the latter is practically embraced by the said fingers and these fingers are close enough together so that the beet cannot escape between two adjacent pairs of fingers. The parts are so timed in operation that when the knife 61 has engaged the beet tops and been moved far enough to sever the top from the beet the fingers 33 have fully embraced the beet and on the further progress of the machine begin to lift the beet from the ground, which latter has in part been already loosened by the plow-points 55. In the meantime the other fingers 37 have engaged the severed beet top and caused the same to travel along the upper side of the strip 64 while the fingers 33 hold the beet root against the outer face of said strip 64. As soon as the next beet in the row is encountered then the same process is repeated and so throughout the row of beets. The beet roots are carried upward by the fingers 33 and the tops by the fingers 37. As the beet tops and roots are moved to the upper part of the machine by the continuous rotation of the drums 1 and 2, the tops are directed toward the chute 83 by the curved upper end of the strip 64, the fingers 37 being free to gravitate to a pendent position so as to free the tops and permit them to fall into the chute by which latter they are directed to the outside of the machine. The beet roots are carried up by the fingers 33 until the latter reach the ledges 39 by which the said fingers are caused to move into the frames or casings 25. This causes the similar inward movement of the beets over the curved upper end of the plate 64 and before the fingers 33 release their hold on the beet the downward curve of the upper end of the plate or strip 64 will permit the beets to begin to fall toward the rods 66 by which they are ultimately caught and directed toward the conveyer belt 67 to be elevated to the top of the conveyer and deposited in a suitable wagon or other receptacle. The operation of removing the beets from the ground and tops from the beets is continuous and progressive so long as the operator desires.

Whenever the operator so desires the machine may be set at the inoperative position by moving the hand lever 42 in a forward direction and causing the lever to catch over one of the pins 45. This will cause the elevation of the plow 54 and at the same time the movement of the arms 41 so as to no longer direct the rollers 33 against the ledges 39. Under these conditions the fingers 33 will remain in the retracted position and will not enter the ground. If the machine is to be transported any distance then the operator may move the hand lever 77 to disengage the pinion 75 from the gear teeth 12 and then by winding up the rope or cable 78 on the drum 80 the conveyer frame 68 may be brought to an upright position in close relation to the drum 1 so as to be out of the way for transportation.

The machine hereinbefore described is a harvester for a single row of beets but it may be made for a double row of beets by merely duplicating the digging mechanism and suitably spacing the same.

What is claimed is:—

1. A beet harvester having means for severing the tops from the beets while the latter are in the ground, means for conveying the severed beet tops to a point of discharge, means for lifting the beet roots from the ground and for directing the said roots to a point of discharge, and a means coacting with and common to the conveying means for both the severed beet tops and beet roots for maintaining the said tops and roots separated throughout their passage to the respective points of discharge.

2. In a beet harvester, opposed series of fingers, a carrier therefor, and means for projecting said fingers from and retracting them into said carrier, and means for causing the approach of the free ends of opposed fingers while being projected.

3. In a beet harvester, two rotatable series of fingers in opposed relation, a carrier therefor, means for causing the projection of said fingers from the carrier on approaching the ground and for holding them in the projected position until they recede from the surface of the ground, and means for then retracting the fingers into the carrier and so holding them until they again approach the ground.

4. In a beet harvester, two rotatable series of fingers in opposed relation, a carrier therefor, means for causing the projection of said fingers from the carrier on approaching the ground and for holding them in the projected position until they recede from the surface of the ground, means for then retracting the fingers into the carrier and so holding them until they again approach the ground, and means for causing the approach of the outer ends of the fingers one toward the other while being projected.

5. In a beet harvester, two rotatable series of fingers in opposed relation, a carrier therefor, supports for the fingers in said carrier, and two coacting guides for causing the projection of the fingers from the carrier, one of said guides having a continuation beyond the other guide in the path of the finger supports for causing the retraction of the fingers into the carrier.

6. In a beet harvester, two rotatable series of fingers in opposed relation, a carrier therefor, supports for the fingers in said carrier, two coacting guides for causing the projection of the fingers from the carrier, one of said guides having a continuation beyond the other guide in the path of the finger supports, for causing the retraction of the fingers into the carrier, and means for causing the approach of the outer ends of the fingers when projected.

7. In a beet harvester, two rotatable series of fingers in opposed relation, a carrier therefor, and two coacting guides for causing the projection of the fingers from the carrier, one of said guides being movable into and out of operative relation to the other guide.

8. In a beet harvester, two rotatable series of fingers in opposed relation, a carrier therefor, supports for the fingers in said carrier, and two coacting guides for causing the projection of the fingers from the carrier, one of said guides being movable into and out of operative relation to the other guide and the second guide having a continuation beyond the first guide in the path of the finger supports for causing the retraction of the fingers into the carrier.

9. In a beet harvester, two rotatable series of fingers in opposed relation, a carrier therefor, supports for the fingers in said carrier, two coacting guides for causing the projection of the fingers from the carrier, one of said guides being movable into and out of operative relation to the other guide, and the second guide having a continuation beyond the first named guide in the path of the finger supports for causing the retraction of the fingers into the carrier, and means for causing the approach of the outer ends of the fingers when projected.

10. In a beet harvester, two rotatable drums, a circular series of fingers on each drum and supports for the fingers movable radially in the drums, a non-rotatable member carried by the drums, guides on the non-rotatable member for causing radial movement of the finger supports, and means for causing lateral movement of the fingers during the radial movement of their supports.

11. In a beet harvester, two rotatable drums, a circular series of fingers on each drum and supports for the fingers movable radially in the drum, a non-rotatable member carried by the drums, two coacting guides on the non-rotatable member for causing radial movement of the finger supports, one of said guides being movable into and out of operative relation to the other guide, and means for causing lateral movement of the fingers during the radial movement of their supports.

12. In a beet harvester, rotatable members, a non-rotatable member carried by the first named members, circular series of fingers in opposed relation on the rotatable members, and guides on the non-rotatable member for causing movement of the fingers into and out of the rotatable members by the rotation of the latter.

13. In a beet harvester, rotatable members, a non-rotatable member carried by the first named members, circular series of fingers in opposed relation on the rotatable members and coacting guides on the non-rotatable member for causing movement of the fingers into and out of the rotatable members by the rotation of the latter, one of said guides being movable into and out of operative relation to the other guide.

14. In a beet harvester, a non-rotatable frame, two rotatable drums inclosing the frame and constituting the support for the latter, a circular series of fingers carried by each drum, supports for the fingers slidable radially in the drums, and guides on the frame for causing radial movement of the finger supports.

15. In a beet harvester, a non-rotatable frame, two rotatable drums inclosing the frame and constituting the supports for the latter, a circular series of fingers carried by each drum, supports for the fingers slidable radially in the drums, guides on the frame for causing radial movement of the finger supports, and means for causing movement of the fingers to and from each other in the direction lateral to the radial movement of the finger supports.

16. In a beet harvester, a non-rotatable frame, two rotatable drums inclosing the frame and constituting the supports for the latter, a circular series of fingers carried by each drum, supports for the fingers slidable radially in the drums, guides on the frame for causing radial movement of the finger supports, and means on the drums engaging the fingers for causing movement of the latter to and from each other in a direction lateral to the radial movement of the finger supports.

17. In a beet harvester, two spaced and independently rotatable drums carrying a circular series of fingers, an intermediate non-rotatable frame connecting and spacing the drums, and means for causing the projection of the fingers from and their retraction into the drums in sequence and the simultaneous movement of the outer ends of the fingers in a direction parallel with the axis of rotation of the drums.

18. In a beet harvester, two spaced and independently rotatable drums each carrying a circular series of fingers, an intermediate non-rotatable frame connecting and spacing the drums, means for causing the projection of the fingers from and their retraction into the drums in sequence and the simultaneous movement of the outer ends of the fingers in a direction parallel with the axis of rotation of the drums, other fingers carried by and rotatable with the drums and moving in a path interior to the first named fingers, and a separating member intermediate of the paths of the two sets of fingers.

19. In a beet harvester, two spaced and independently rotatable drums each carrying a circular series of fingers, an intermediate rotatable frame connecting and spacing the drums, means for causing the projection of the fingers from and their retraction into the drums in sequence and the simultaneous movement of the outer ends of the fingers in a direction parallel with the axis of rotation of the drums, other fingers carried by and rotatable with the drums and moving in a path interior to the first named fingers, and a separating strip between the active paths of the two sets of fingers, said strip extending from a point substantially coincident with the engagement of the fingers with the beets to a point of release thereof.

20. In a beet harvester, rotatable drums each having a circular series of segmental casings with guides radially disposed, a sliding block in each casing, a finger pivoted at one end to the block and movable through one end of the casing, and means at such end of the casing for causing a movement of the outer end of the finger lateral to the line of travel of the block.

21. In a beet harvester, rotatable drums each having a circular series of segmental casings with guides radially disposed, a sliding block in each casing, a finger pivoted at one end to the block and movable through one end of the casing, and an anti-friction roller at such end of the casing at one side of the line of travel of the block for diverting the direction of travel of the outer end of the finger with relation to the line of travel of the block.

22. In a beet harvester, a pair of spaced drums, an intermediate non-rotatable connecting frame therefor, a circular series of fingers carried by each drum and movable into and out of the latter, supports for the fingers movable therewith and provided with projecting parts, the non-rotatable frame carrying guides concentric for a portion of their length with the axis of the drums and determining the inner limit of travel of the fingers and at the ends extending toward the periphery of the drums, said guides being in the paths of the projecting members on the finger supports, and other guide members carried by the frame and coacting with the first named guide members for a portion of the length of the latter.

23. In a beet harvester, a pair of spaced drums, an intermediate non-rotatable connecting frame therefor, a circular series of fingers carried by each drum and movable into and out of the latter, supports for the fingers movable therewith and provided with projecting parts, the non-rotatable frame carrying guides concentric for a portion of their length with the axis of the drums and determining the inner limit of the travel of the fingers and at the ends extending toward the periphery of the drums, said guides being in the paths of the projecting members on the finger supports, and pivotally mounted guide arms movable into and out of operative relation with a portion of the first named guides.

24. In a beet harvester, a pair of spaced drums, an intermediate non-rotatable connecting frame therefor, a circular series of fingers carried by each drum and movable into and out of the latter, supports for the fingers movable therewith and provided with projecting parts, the non-rotatable frame carrying guides concentric for a portion of their length with the axis of the drums and determining the inner limit of the travel of the fingers and at the ends extending toward the periphery of the drums, said guides being in the paths of the projecting members on the finger supports, pivotally mounted guide arms movable into and out of operative relation with a portion of the first named guides, and means for preventing the projecting members on the finger supports from passing to the active sides of the guide arms when the direction of rotation of the drums is reversed.

25. In a beet harvester, a pair of spaced drums, an intermediate non-rotatable connecting frame therefor, a circular series of fingers carried by each drum and movable into and out of the latter, supports for the fingers movable therewith and provided with projecting parts, the non-rotatable frame carrying guides concentric for a portion of their length with the axis of the drums, and determining the inner limits of travel of the fingers and at the ends extending toward the periphery of the drums, said guides being in the paths of the projecting members on the finger supports, pivotally mounted guide arms movable into and out of operative relation with a portion of the first named guides, and links pivoted to the outer ends of said arms and slidably mounted at the other ends in the non-rotatable frame.

26. A beet harvester having means for severing the tops from the beets while the latter are in the ground, means for engaging the severed tops to move them toward a point of discharge, means for lifting the beet roots from the ground and for moving the roots to a point of discharge, a common operating means for actuating the means for moving both the beet tops and the beet roots to the respective points of discharge, and a means common to the means for moving the severed tops toward the point of discharge and the means for moving the roots toward the point of discharge for directing the tops and roots separately to their respective points of discharge.

27. In a beet harvester, two rotatable drums each carrying fingers movable into the drums and out of the same peripherally in a direction to bring the outer ends of the fingers into close relation, other fingers carried by the drums closer to the axis thereof than the first named fingers, a dividing strip between the two sets of fingers through their active travel, means for cutting the beet tops from the beet roots and directing them to one side of the dividing strip in the path of the second named fingers, and separate means for receiving the beet roots and beet tops.

28. In a beet harvester, rotatable drums, fingers on each drum capable of being moved into and out of said drums at the periphery thereof, coacting guides for causing the projecting and retracting movement of said fingers, one of said guides being movable into and out of operative relation to the other, a plow member for loosening the earth about the beets, and means common to both the movable guide members and the plow for adjusting them simultaneously.

29. In a beet harvester, rotatable drums, fingers on each drum capable of being moved into and out of said drums at the periphery thereof, coacting guides for causing the projecting and retracting movements of the fingers, one of said guide members being movable into and out of active relation to the other, a plow member for loosening the earth about the beets, a rock shaft carrying the movable guide members, an arm on the rock shaft, connections between the arm and plow, and means for operating the rock shaft to simultaneously adjust the guide members and plow.

30. In a beet harvester, a non-rotatable frame having a circular track on each side thereof, a rotatable supporting drum on each side of the frame, said drums having an internal annular track matching the corresponding track on the frame, a series of roller bearings between each drum and the non-rotatable frame, and a rod for each series of rollers bent at intervals to embrace the journals of the rollers and space the latter.

In testimony that I claim the foregoing as my own, I have hereto affixed my signature in the presence of two witnesses.

FRED. C. HARDING.

Witnesses:
  JOHN D. MILLIKEN,
  ALBERT F. DODD.